(12) United States Patent
Sakuma et al.

(10) Patent No.: US 6,734,228 B1
(45) Date of Patent: May 11, 2004

(54) WATER-BASED RESIN COMPOSITION

(75) Inventors: Tadashi Sakuma, Wakayama (JP);
Kuniyasu Kawabe, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/936,428

(22) PCT Filed: Mar. 10, 2000

(86) PCT No.: PCT/JP00/01444

§ 371 (c)(1),
(2), (4) Date: Sep. 13, 2001

(87) PCT Pub. No.: WO00/55247

PCT Pub. Date: Sep. 21, 2000

(30) Foreign Application Priority Data

| Mar. 15, 1999 | (JP) | ............................................ | 11/068644 |
| Aug. 2, 1999 | (JP) | ............................................ | 11/218913 |
| Sep. 13, 1999 | (JP) | ............................................ | 11/259470 |

(51) Int. Cl.⁷ ................................................ C08K 9/10
(52) U.S. Cl. ........................ 523/211; 523/210; 523/501; 523/205; 524/276; 524/845; 528/274
(58) Field of Search ................................. 523/501, 205, 523/210, 211; 524/276, 845; 528/274

(56) References Cited

U.S. PATENT DOCUMENTS

| 4,077,939 A | 3/1978 | Paparatto et al. | |
| 4,303,567 A | * 12/1981 | Frank et al. | ................. 524/604 |
| 5,464,885 A | 11/1995 | Craun | |
| 5,830,928 A | 11/1998 | Faler et al. | |

FOREIGN PATENT DOCUMENTS

| EP | A2812878 | 12/1997 |
| JP | A52063286 | 5/1977 |
| JP | A7001666 | 1/1995 |
| JP | A10036653 | 2/1998 |
| WO | A1-9951696 | 10/1999 |

* cited by examiner

*Primary Examiner*—Tae H. Yoon
(74) *Attorney, Agent, or Firm*—Birch, Stewart, Kolasch & Birch, LLP

(57) ABSTRACT

A thermosetting water-based resin composition comprising an oil-soluble initiator of which a temperature for one-minute half-life is from 90° to 270 ° C. and a polycondensation resin comprising an unsaturated dicarboxylic acid having a radical-polymerizable unsaturated bond or an acid anhydride thereof as at least one constituent monomer, wherein the polycondensation resin has an acid value of from 3 to 100 mg KOH/g, and wherein said oil-soluble initiator is present in said polycondensation resin; a process for preparing the thermosetting water-based resin composition; a molding compound composition comprising the water-based resin composition; and a molding product prepared by molding the molding compound composition.

14 Claims, No Drawings

WATER-BASED RESIN COMPOSITION

This application is the national phase under 35 U.S.C. § 371 of PCT International Application No. PCT/JP00/01444 which has an International filing date of Mar. 10, 2000, which designated the United States of America.

TECHNICAL FIELD

The present invention relates to a thermosetting water-based resin composition, a process for preparing the same, and a molding compound composition comprising the water-based resin composition and a molding product prepared by molding the molding compound composition.

BACKGROUND ART

As molding products used in automobile interior materials and construction materials, there have been used various molding products prepared by molding a substrate made of fibers or wood materials with an adhesive such as phenolic resins, urea resins, and melamine resins (Japanese Patent Laid-Open No. Hei 7-1666). In this process, however, there arises a problem of generating formalin from the molding products. In addition, the molding processing is carried out by using a mixture prepared by dissolving an unsaturated polyester resin and an organic peroxide in a polymerizable monomer such as styrene (Japanese Patent Laid-Open No. Hei 10-36653), or by using a mixture prepared by simply mixing an unsaturated polyester resin and an organic peroxide (Japanese Patent Laid-Open No. Sho 52-63286). In these processes, however, there arise such problems that the monomers have odors and that homogeneous curing reaction is less likely to take place.

An object of the present invention is to provide a molding compound composition in which an environmental problem is improved and a homogeneous curing reaction takes place, and a molding product prepared by molding the molding compound composition.

Another object of the present invention is to provide a water-based resin composition suitable for obtaining the molding compound composition, and a process for preparing the same.

These and other objects of the present invention will be apparent from the following description.

DISCLOSURE OF INVENTION

The present invention pertains to:

[1] a thermosetting water-based resin composition (hereinafter referred to as "water-based resin composition") comprising an oil-soluble initiator of which a temperature for one-minute half-life is from 90° to 270° C. and a polycondensation resin comprising an unsaturated dicarboxylic acid having a radical-polymerizable unsaturated bond or an acid anhydride thereof as at least one constituent monomer, wherein the polycondensation resin has an acid value of from 3 to 100 mg KOH/g, and wherein said oil-soluble initiator is present in said polycondensation resin;

[2] the water-based resin composition according to item [1] above, further comprising a compound having two or more radical-polymerizable unsaturated bonds;

[3] the water-based resin composition according to item [1] or [2] above, further comprising an acetylene glycol compound represented by the formula (I):

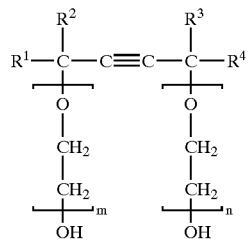

wherein each of $R^1$ to $R^4$ is independently a linear alkyl group having 1 to 6 carbon atoms and a branched alkyl group having 3 to 6 carbon atoms; and each of m and n is an integer of 0 or more;

[4] the water-based resin composition according to any one of items [1] to [3] above, further comprising a wax;

[5] a process for preparing a thermosetting water-based resin composition, the process comprising removing an organic solvent by distillation from a raw material composition comprising a polycondensation resin comprising an unsaturated dicarboxylic acid having a radical-polymerizable unsaturated bond or an acid anhydride thereof as at least one constituent monomer, wherein the polycondensation resin has an acid value of from 3 to 100 mg KOH/g; an oil-soluble initiator of which a temperature for one-minute half-life is from 90° to 270° C.; the organic solvent; a neutralizing agent; and water, to give the thermosetting water-based resin composition comprising the polycondensation resin and the oil-soluble initiator, wherein said oil-soluble initiator is present in said polycondensation resin;

[6] the process according to item [5] above, wherein the raw material composition further comprises a compound having two or more radical-polymerizable unsaturated bonds;

[7] the process according to item [5] or [6], wherein the raw material composition further comprises an acetylene glycol compound represented by the formula (I);

[8] a molding compound composition comprising the water-based resin composition of any one of items [1] to [4] above; and

[9] a molding product prepared by molding the molding compound composition of item [8] above.

BEST MODE FOR CARRYING OUT THE INVENTION

One of the large feature of the water-based resin composition of the present invention resides in that an oil-soluble initiator of which a temperature for one-minute half-life of from 90° to 270° C. is contained in a polycondensation resin particle. When the water-based resin composition comprising the oil-soluble initiator is used for a molding compound composition, the water-based resin composition is adhered evenly on a molding substrate, and when such a molding compound composition is molded (heat-pressed), the oil-soluble initiator is decomposed in the fine particles of the polycondensation resin. Therefore, the homogeneous thermosetting reaction efficiently takes place in an entire molding compound composition, so that there can be exhibited an excellent effect that a molding product having a homogeneous strength is obtained. Incidentally, the water-based resin composition of the present invention does not use at all any material which generates formaldehyde, and the like, and it is also water-based, so that there arise no environmental problems. In addition, in the present specification, the term "oil-soluble initiator" refers to an initiator which is dissolved in an organic solvent usable in the preparation process at room temperature (20° C.) in an amount of 1% by weight or more. In addition, the term "temperature for one-minute half-life" refers to a temperature at which the amount of active oxygen in benzene is halved in one minute.

The oil-soluble initiator is not particularly limited, as long as the half-life temperature in one minute is from 90° to 270° C., preferably from 90° to 200° C. The oil-soluble initiator includes organic peroxides, azo polymerization initiators, and the like. Among them, the organic peroxides are preferable from the viewpoint of having high reactivity.

The organic peroxides include ketone peroxides, peroxyketals, hydroperoxides, dialkyl peroxides, diacyl peroxides, peroxydicarbonates, peroxyesters, and the like, and those having large amount of active oxygen and small activation energy are preferable. Preferable concrete examples include lauroyl peroxide [temperature for one-minute half-life (referred to the same hereinafter, and omitted): 116.4° C.], 1,1-bis(t-hexylperoxy)-3,3,5-trimethylcyclohexane [147.1° C.], 1,1-bis(t-butylperoxy)-3, 3,5-trimethylcyclohexane [149.0° C.], t-butylperoxylaurate [159.4° C.], t-butylperoxyisopropylmonocarbonate [158.8° C.], t-butylperoxy-2-ethylhexylcarbonate [161.4° C.], di-t-butylperoxyhexahydroterephthalate [142.0° C.], dicumyl peroxide [175.2° C.], 2,5-dimethyl-2,5-di(t-butylperoxy) hexane [179.8° C.], di-t-butyl peroxide [185.9° C.], t-butylperoxy-2-ethylhexanoate [134.0° C.], bis(4-t-butylcyclohexyl)peroxydicarbonate [92.1° C.], t-amylperoxy-3,5,5-trimethylhexanoate [130.0° C.], 1,1-di (t-amylperoxy)-3,3,5-trimethylcyclohexane [151.0° C.], and the like.

The azo polymerization initiator includes 2,2'-azobis-isobutyronitrile [temperature for one-minute half-life (referred to the same hereinafter, and omitted): 116.0° C.], 2,2'-azobis-2-methylbutyronitrile [119.0° C.], 2,2'-azobis-2, 4-dimethylvaleronitrile [104.0° C.], 1,1'-azobis-1-cyclohexanecarbonitrile [141.0° C.], dimethyl-2,2'-azobisisobutyrate [119.0° C.], 1,1'-azobis-(1-acetoxy-1-phenylethane) [111.0° C.], and the like.

These oil-soluble initiators may be alone or in admixture of two or more kinds.

The content of the oil-soluble initiator is preferably from 0.1 to 30 parts by weight, more preferably from 0.1 to 20 parts by weight, still more preferably from 0.5 to 20 parts by weight, most preferably from 0.5 to 10 parts by weight, based on 100 parts by weight of the polycondensation resin, from the viewpoints of the curing rate required for the material to be molded and a balance between the strength of the molding compound and the storage stability of the water-based resin composition.

The polycondensation resin usable in the present invention may be any kind as long as the polycondensation resin comprises an unsaturated dicarboxylic acid having a radical-polymerizable unsaturated bond or an acid anhydride thereof as at least one of constituent monomers, wherein the polycondensation resin has an acid value of from 3 to 100 mg KOH/g. Concretely, polyesters and polyester-polyamides are preferable, from the viewpoints of easiness in the preparation of the water-based resin composition, which is a water-based dispersion, adhesion to various substrates, and no use of formalin as the raw material.

The polyester usable in the present invention can be prepared, for instance, by polycondensing an acid component with a polyol component.

The unsaturated dicarboxylic acid having a radical-polymerizable unsaturated bond, or an acid anhydride thereof used as an acid component includes maleic acid, fumaric acid, tetrahydrophthalic acid, itaconic acid, citraconic acid, and acid anhydrides thereof, and maleic acid, fumaric acid, maleic anhydride, and tetrahydrophthalic anhydride are preferable. The content of the unsaturated dicarboxylic acid or acid anhydride thereof is preferably from 20 to 100% by mol, more preferably from 50 to 100% by mol of the acid component.

The other acid component usable in the present invention is not particularly limited, and for instance, the following polycarboxylic acids or derivatives thereof can be used.

The polycarboxylic acids or derivatives thereof are not particularly limited, and non-radically reactive, dicarboxylic or tricarboxylic acids having 4 to 40 carbon atoms are preferably used. Examples thereof include dicarboxylic acids such as phthalic acid, isophthalic acid, terephthalic acid, succinic acid, a dimer acid, alkenylsuccinic acids ($C_4$ to $C_{20}$), cyclohexanedicarboxylic acid, and naphthalenedicarboxylic acid; tricarboxylic acids such as 1,2,4-benzenetricarboxylic acid (trimellitic acid); acid anhydrides thereof; and lower alkyl esters ($C_1$ to $C_4$) thereof.

The polyol component is not particularly limited. Preferable are aliphatic polyols having 2 to 10 carbon atoms such as ethylene glycol, propylene glycol, 1,4-butanediol, neopentyl glycol, glycerol, pentaerythritol, trimethylolpropane, sorbitol, and 1,6-hexanediol; aromatic polyols such as bisphenol A, hydrogenated bisphenol A; and alkylene ($C_2$ to $C_3$) oxide adducts (the additional molar number of alkylene oxide being from 2 to 10) prepared therefrom. Especially, propylene oxide adduct of bisphenol A is preferable from the viewpoint of heat resistance.

The polycondensation of the polyol component and the acid component may be carried out by a known process, comprising, for instance, polycondensing a polyol component with an acid component at a temperature of 180° to 250° C. in an inert gas atmosphere, and its terminal point may be determined by monitoring a softening point (Tm), an acid value (AV), or the like, which can be used as a reference for a molecular weight of the resulting product.

The molar ratio of the polyol component to the acid component may be appropriately determined from the values of the AV, the number-average molecular weight, the glass transition point (Tg), or the like of the polyester, and it is preferable that the molar ratio (polyol component: acid component) is from 1:0.6 to 1:1.5.

In addition, during the polycondensation, there can be appropriately used additives including esterification catalysts such as dibutyltin oxide and polymerization inhibitors such as hydroquinone monomethyl ether.

The polyester-polyamide usable in the present invention can be prepared by a well-known method, for example, by polycondensation by adding an amine derivative to ingredients comprising the acid component and the polyol component used in the preparation of the polyester. The amine derivative is not particularly limited, and includes polyamines such as ethylenediamine, hexamethylenediamine, diethylenetriamine, and xylylenediamine; aminocarboxylic acids such as methylglycine, trimethylglycine, 6-aminocaproic acid, δ-aminocaprylic acid, and ε-caprolactam; and amino alcohols such as propanolamine. From the viewpoint of the solubility to an organic solvent, methylglycine, trimethylglycine and 6-aminocaproic acid are preferable.

The molar ratio between the polyol component, the acid component and the amine derivative in the polyester-polyamide may be appropriately determined from the values of the AV, the number-average molecular weight, the Tg, or the like of the polyester-polyamide, in the same manner as those of the polyester.

The AV determined by the method in accordance with JIS K 0070 of the polycondensation resin obtained by the above process is from 3 to 100 mg KOH/g, preferably from 10 to 70 mg KOH/g. The AV is 3 mg KOH/g or more, from the viewpoint of obtaining a stable water dispersion, and the AV is 100 mg KOH/g or less, from the viewpoint of making the polycondensation resin water-insoluble, thereby having excellent compatibility with the oil-soluble initiator. Incidentally, the AV may be adjusted by regulating the molar ratio of the acid component/polyol component of the raw material, the reaction time, and the like.

In addition, it is desired that a saponification value (SV) determined by the method in accordance with JIS K 0070 of the polycondensation resin is from 150 to 750 mg KOH/g, preferably from 250 to 600 mg KOH/g, more preferably from 250 to 300 mg KOH/g. The SV is preferably 150 mg KOH/g or more, from the viewpoint of increasing the strength after curing, and the SV is preferably 750 mg KOH/g or less, from the viewpoints of having an appropriate affinity with water and obtaining a molding material having excellent water resistance. Incidentally, the SV may be adjusted by regulating the molecular weights of the acid component and the polyol component, the ratios thereof, and the like.

Further, the hydroxyl value (OHV) determined by the method in accordance with JIS K 0070 of the polycondensation resin is preferably from 1 to 50 mg KOH/g. Moreover, it is preferable that the Tg of the polycondensation resin (determined by differential scanning calorimeter) is from 0° to 100° C., that the Tm (determined by flow tester method) is from 800 to 180° C., and that the number-average molecular weight (value converted as polystyrene by GPC method) is from 1000 to 50000. Also, when the polycondensation resin is a polyester-polyamide, it is desired that the amine value of the polycondensation resin determined by the method in accordance with ASTM D2073 is 10 mg KOH/g or less.

In addition, it is necessary that carboxyl group of the polycondensation resin is at least partly neutralized, and for instance, the polycondensation resin is a neutralized product by adding a neutralizing agent to a solution comprising the polycondensation resin.

The neutralizing agent is not particularly limited, as long as it is capable of ionizing the carboxyl group. The neutralizing agent is preferably hydroxides of alkali metals, alkaline earth metals, and the like, and various amines, and especially hydroxides of alkali metals are preferable. The amount of the neutralizing agent used is preferably 0.8 to 1.4 equivalent in proportion to the carboxyl group of the polycondensation resin. Incidentally, the neutralizing agent may be used by itself, or it may be diluted or dissolved in a very small amount of water.

Although the content of the polycondensation resin in the water-based resin composition may differ depending upon the mold processing methods, the content is preferably from 5 to 60% by weight, more preferably from 15 to 50% by weight, from the viewpoint of attaining an excellent balance between the strength required and the stability of the dispersion. Especially, when a compound having two or more radically-polymerizable unsaturated bonds is used as described below, the content of the polycondensation resin is more preferably from 15 to 60% by weight, still more preferably from 25 to 60% by weight.

The water-based resin composition of the present invention may further comprise a compound having two or more radically-polymerizable unsaturated bonds (hereinafter referred to as "unsaturated bonds-containing compound").

Since the water-based resin composition comprises the unsaturated bonds-containing compound, the cross-linking density of the polycondensation resin after curing becomes high, so the strength is enhanced, so that there is exhibited an effect that a water-based resin composition having excellent heat resistance and water resistance can be obtained. Further, when the water-based resin composition comprising the unsaturated bonds-containing compound and the oil-soluble initiator is used as a molding compound composition, resin fine particles can be homogeneously immersed, applied, mixed or adhered to a molding substrate. Therefore, when the molding compound composition is molded (heat-pressed), radicals are generated from the oil-soluble initiator in the fine particles of the polycondensation resin, so that the polymerization reaction takes place between unsaturated bonds of the polycondensation resin and the unsaturated bonds-containing compound. Thus, there is exhibited an excellent effect that a homogeneous curing reaction efficiently takes place in the entire molding compound composition, thereby making it possible to obtain a molding product having a homogeneous strength.

The unsaturated bonds-containing compound usable in the present invention include one or more compounds selected from the group consisting of compounds having (meth)acryl groups at both ends, compounds having allyl group, and compounds having divinyl group. Among them, when the molding compound composition prepared from a water-based resin composition is heat-cured, the compounds having allyl group are preferable from the viewpoints of having functions of being compatible with the polycondensation resin and thereby lowering the melting point of the polycondensation resin in a heated state prior to curing; the improvement in strength of the molding product after curing owing to high reactivity caused by lowering of the melting point of the polycondensation resin and also to an increase in the cross-linking density caused by an increase in the amount of the unsaturated bonds; the storage stability of the water-based resin composition; and the odor during molding. Concretely, diallyl compounds such as diallyl phthalate, diallyl isophthalate, diallyl terephthalate, diallyl maleate, diallyl itaconate, diallyl hexahydrophthalate, diailyl phthalate prepolymer, and diallyl isophthalate prepolymer; and triallyl compounds such as triallyl 1,2,4-benzenetricarboxylate are more preferable.

In addition, compounds having (meth)acryl groups at both ends include ethylene glycol dimethacrylate, diethylene glycol dimethacrylate, triethylene glycol dimethacrylate, polyethylene glycol dimethacrylates, neopentyl glycol dimethacrylate, 1,3-butylene glycol dimethacrylate, 1,6-hexanediol dimethacrylate and the like, and triethylene glycol dimethacrylate, polyethylene glycol dimethacrylates and the like are preferable. The preferable compounds having divinyl group include divinylbenzene, divinylnaphthalene, and the like.

These unsaturated bonds-containing compounds may be used alone or in admixture of two or more kinds.

The content of the unsaturated bonds-containing compound is preferably from 5 to 80 parts by weight, more preferably from 10 to 60 parts by weight, based on 100 parts by weight of the polycondensation resin, from the viewpoint of making the strength of the resulting molding product high, and improving the heat resistance and the water resistance.

The water-based resin composition of the present invention may further comprise an acetylene glycol compound represented by the formula (I):

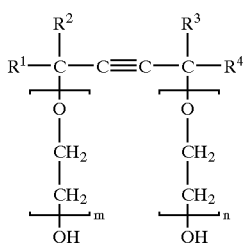

wherein each of $R^1$ to $R^4$ is independently a linear alkyl group having 1 to 6 carbon atoms and a branched alkyl group having 3 to 6 carbon atoms; and each of m and n is an integer of 0 or more.

During the preparation of the water-based resin composition, especially when an organic solvent is removed by distillation from a raw material composition comprising the raw materials of the resin composition, since the formation of the resin fine particles in the phase inversion process accompanied by removal of the organic solvent by distillation, and its dispersion stability can be improved and curing reaction caused by the elevation of viscosity of the dispersion and the accumulated heat can be prevented by using the acetylene glycol compound represented by the formula (I), the water-based resin composition which has a high solid content and low viscosity can be efficiently obtained. Therefore, since the resulting water-based resin composition has excellent handleability, a high solid content and a low water content, there is exhibited an excellent effect that the molding time can be shortened.

In the acetylene glycol compound represented by the formula (I), each of $R^1$ and $R^4$ more preferably has 2 to 4 carbon atoms, and each of $R^2$ and $R^3$ more preferably has 1 to 2 carbon atoms.

Examples of the acetylene glycol compound represented by the formula (I) include compounds represented by the formula (a) to (c):

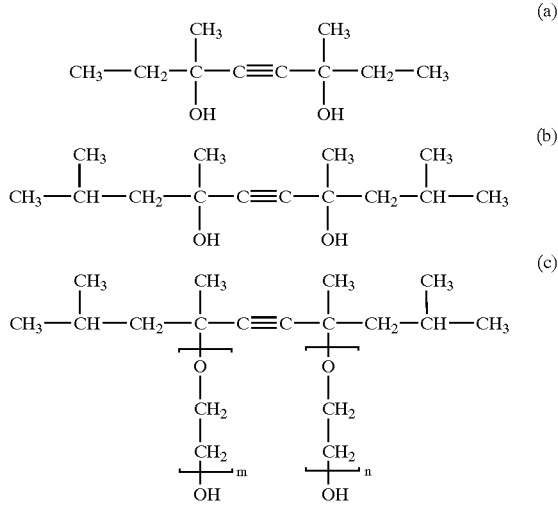

wherein m and n are as defined above. Among them, the compounds represented by the formula (c) are preferable, and those having a total of m and n of from 3 to 40 are more preferable, and those from 8 to 35 are still more preferable.

The content of the acetylene glycol compound represented by the formula (I) is preferably from 0.5 to 30 parts by weight, more preferably from 1 to 25 parts by weight, still more preferably from 2 to 20 parts by weight, based on 100 parts by weight of the polycondensation resin, from the viewpoint of the formation and dispersion stability of the resin fine particles, and the suppression of the curing reaction caused by the elevation of viscosity of the dispersion and accumulated heat, and further the homogeneous mixing and adhesion of the resin fine particles and the substrate.

In addition, it is preferable that the water-based resin composition of the present invention further comprises a wax, from the viewpoints of improvement in releasability of the molding product from a molding machine during molding, and improvement in water resistance of the molding product. The wax includes paraffin waxes, microcrystalline waxes, petrolatum, carnauba waxes, and emulsions containing them.

The content of the wax in the water-based resin composition is preferably from 0.05 to 10% by weight, more preferably from 0.1 to 5% by weight, from the viewpoints of the releasability of the molding product from a molding machine during molding, and the water resistance of the molding product.

Next, the process for preparing a water-based resin composition of the present invention will be explained. The water-based resin composition of the present invention is prepared by a so-called "phase-inversion emulsification." An example of such a preparation process comprises removing an organic solvent by distillation from a raw material composition comprising the polycondensation resin, the oil-soluble initiator, the organic solvent, the neutralizing agent and water, and optionally at least one of the unsaturated bonds-containing compound, the acetylene glycol compound represented by the formula (I) and the wax. Concretely, it is preferable that a process comprises dissolving the polycondensation resin and the oil-soluble initiator, and optionally the monomers having unsaturated bonds and the unsaturated bonds-containing compound in an organic solvent; further adding a neutralizing agent and water, and optionally an acetylene glycol compound represented by the formula (I), a wax and a surfactant; and thereafter removing the organic solvent by distillation from the mixture to carry out the phase inversion to an aqueous system. The phase inversion may take place when water is added, and it is more preferable that the phase inversion takes places during the removal of the organic solvent by distillation, from the viewpoint of obtaining a stable dispersion.

In the present invention, by employing the above process, there can be exhibited excellent effects that there can be readily obtained a water-based resin composition in which the polycondensation resin particles in fine particle form having an average particle size of preferably 5 µm or less, more preferably 2 µm or less, still more preferably 1 µm or less are dispersed in an aqueous medium, wherein the oil-soluble initiator and optionally the unsaturated bonds-containing compounds are contained in the polycondensation resin.

Incidentally, the organic solvent usable in the present invention is preferably ketone solvents having 3 to 8 carbon atoms, such as acetone, methyl ethyl ketone and diethyl ketone; ether solvents having 4 to 8 carbon atoms such as tetrahydrofuran (THF), and the like, and acetone, methyl ethyl ketone and THF are more preferable. It is preferable that the amount of the organic solvent is from 100 to 600 parts by weight, based on 100 parts by weight of the polycondensation resin.

In addition, the amount of water used is preferably from 100 to 1000 parts by weight, based on 100 parts by weight of the polycondensation resin. In this case, when various surfactants such as anionic and nonionic surfactants, especially sulfates of higher alcohols, sulfates of polyoxyethylene alkyl ethers, dialkylsulfosuccinates, formalin condensates of β-naphthalenesulfonates, are further added to water in an amount of 1 to 20 parts by weight, based on 100 parts by weight of the polycondensation resin, the average particle size of the resulting fine particles can be made advantageously small, and the resin concentration can be desirably increased.

In addition, a water-soluble persulfate such as sodium persulfate, potassium persulfate or ammonium persulfate, or a water-soluble azo compound such as 2,2-azobis (2-amidinopropane) dihydrochloride, 4,4'-azobis(4-cyanovaleric acid) or 2,2-azobisisobutylamide dehydrate is preferably added as a water-soluble initiator, because radicals are also formed from the above compounds by heating during molding, whereby the curing reaction is further accelerated. The water-soluble initiator may be added during mixing of the substrate and the water-based resin composition.

In addition, the removal of the organic solvent by distillation is preferably carried out, for instance, under reduced pressure at 30° to 70° C. It is desired that the content of the organic solvent is adjusted to preferably 1% by weight or less, more preferably 0.1% by weight or less. Moreover, it is more preferable that a pH of the resulting treated solution is adjusted to a range of from 6 to 10. The pH adjustment can be made by using the above neutralizing agent.

The fine particles of the water-based resin composition prepared by the above process have an average particle size of preferably from 0.5 to 5000 nm, more preferably from 1 to 2000 nm, still more preferably from 1 to 1000 nm, in order to homogeneously cure the molding product. Here, the average particle size is appropriately adjusted by changing, for instance, the molecular weight, the AV, the degree of neutralization, the conditions for phase-inversion emulsification, or the like of the polycondensation resin.

The liquid viscosity of the water-based resin composition is preferably from 5 to 1000 mPa·s, more preferably from 10 to 800 mPa·s, still more preferably from 20 to 600 mPa·s, from the viewpoints of the handleability, the suppression of the curing reaction caused by accumulated heat of the liquid, and the homogeneous mixing and adhesion of the resin fine particles and the substrate. The liquid viscosity can be determined on the basis of the rotating oscillation-type viscometer.

In order to adjust the liquid viscosity of the water-based resin composition within the above range, it is preferable to add the acetylene glycol compound and the various surfactants listed below during the preparation of the water-based resin composition, or to the prepared water-based resin composition. When the entire solid content concentration of the water-based resin composition is 30% by weight or more, this process is especially effective and preferable.

The water-based resin composition of the present invention may further comprise, in addition to the above ingredients, various conventionally known additives, including, for instance, ultraviolet ray absorbents such as benzotriazole and benzophenone, mildew-proof agents such as chloromethylphenol, chelating agents such as EDTA, oxygen absorbents such as sulfites, and the like.

It is preferable that the water-based resin composition is self-dispersible. Alternatively, the resin composition may be formed by adding a surfactant and dispersing the mixture with a forced agitation dispersion device such as a homomixer, filmics, or an emulsifier such as an attritor.

The water-based resin composition of the present invention is excellent not only in its thermosetting properties, but also in the storage stability, heat resistance and water resistance, so that the water-based resin composition is useful for a raw material for a molding product. The molding compound composition can be obtained by applying, immersing, spray-coating, foam-coating, or the like the water-based resin composition of the present invention to a substrate.

The substrate is not particularly limited, and there can be used inorganic fibers and synthetic fibers such as glass fibers and carbon fibers; organic fibers such as natural fibers; pulp powder; wood powders, wooden chips, and the like.

In addition, there may be used as occasion demands a catalyst, a curing agent, a curing aid which is solid at ambient temperature and has low level of odor such as an oligomer and prepolymer having unsaturated bonds, a cross-linking accelerator, a releasing agent such as an amide wax, a synthetic wax, a synthetic latex or a metal salt of a fatty acid, a filler such as talc, silica, calcium carbonate, clay or aluminum hydroxide, known additives, packing agents and extenders. These optional additives may be added during mixing of the substrate with the water-based resin composition.

The content of the substrate in the molding compound composition is preferably from 1 to 99.5% by weight, more preferably from 20 to 98% by weight, from the viewpoints of the specific gravity of the molding product and the strength of the molding product.

The content of the water-based resin composition in the molding compound composition is preferably from 0.5 to 99% by weight, more preferably from 2 to 80% by weight, from the viewpoints of the specific gravity of the molding product and the strength of the molding product.

A process for molding the molding compound composition of the present invention having the above constitution is not particularly limited, and a known process, such as pressure-molding with heating, compression-molding, laminating-molding, injection-molding, or extrusion-molding, can be employed. In addition, the molding compound composition may be molded after preheating it. In addition, after molding the molding compound composition once, the molding may be carried out again (secondary molding).

Since the molding product obtained by the above process does not cause environmental problem and has sufficient strength, it can be suitably used for automobile interior materials, construction materials, and the like.

RESIN PREPARATION EXAMPLE I-1

The amount 1050 g of PO (2.2 moles) adduct of bisphenol A, 306 g of maleic anhydride (100 mol % of the acid component), 0.7 g of hydroquinone and 1.0 g of dibutyltin oxide were stirred at 210° C. under nitrogen stream. The reaction was terminated when the AV reached 36.4 mg KOH/g. The resulting polyester resin was a pale yellowish solid, and its OHV was 25.4 mg KOH/g, the Tg 61.4° C., the Tm 96.8° C., and the number-average molecular weight 3000. This resin is referred to as Resin I-a.

RESIN PREPARATION EXAMPLE I-2

The amount 1050 g of PO (2.2 moles) adduct of bisphenol A, 365 g of fumaric acid (100 mol % of the acid component), 0.5 g of hydroquinone and 1.0 g of dibutyltin oxide were reacted in the same manner as in Resin Preparation Example I-1. The reaction was terminated when the AV reached 24.3 mg KOH/g. The resulting polyester resin was a pale yellowish solid, and its OHV was 21.5 mg KOH/g, the Tg 56.5° C., the Tm 96.7° C., and the number-average molecular weight 3200. This resin is referred to as Resin I-b.

RESIN PREPARATION EXAMPLE I-3

The amount 1050 g of PO (2.2 moles) adduct of bisphenol A, 313 g of fumaric acid (76.3 mol % of the acid component), 150 g of dimer acid, 20 g of 6-amino-n-caproic acid, 1.0 g of dibutyltin oxide and 0.7 g of hydroquinone were reacted in the same manner as in Resin Preparation Example I-1. Subsequently, 80 g of trimellitic anhydride was added to the reaction mixture, and the reaction was terminated when the AV reached 50.9 mg KOH/g. The resulting polyester-polyamide resin was a pale yellowish solid, and its OHV was 29.6 mg KOH/g, the amine value 0.1 mg KOH/g, the Tg 52.6° C., the Tm 101.5° C., and the number-average molecular weight 2330. This resin is referred to as Resin I-c.

RESIN PREPARATION EXAMPLE I-4

Seventy-four grams of ethylene glycol, 91 g of propylene glycol, 144 g of hydrogenated bisphenol A, 270 g of maleic anhydride (85.2 mol % of the acid component), 90 g of trimellitic anhydride, 0.5 g of hydroquinone and 1.0 g of dibutyltin oxide were reacted in the same manner as in Resin Preparation Example I-1. The reaction was terminated when the AV reached 33.6 mg KOH/g. The resulting polyester resin was a pale yellowish solid, and its OHV was 22.7 mg KOH/g, the Tg 42.5° C., the Tm 100.1° C., and the number-average molecular weight 3500. This resin is referred to as Resin I-d.

RESIN PREPARATION EXAMPLE I-5

Three-hundred grams of PO (2.2 moles) adduct of bisphenol A, 140 g of ethylene glycol, 260 g of maleic anhydride (84.6 mol % of the acid component), 90 g of trimellitic anhydride, 0.7 g of hydroquinone and 1.2 g of dibutyltin oxide were reacted in the same manner as in Resin Preparation Example I-1. The reaction was terminated when the AV reached 40.1 mg KOH/g. The resulting polyester resin was a pale yellowish solid, and its OHV was 34.3 mg KOH/g, the Tg 48.6° C., the Tm 125.3° C., and the number-average molecular weight 3800. This resin is referred to as Resin I-e.

EXAMPLE I-1

Three-hundred grams of the polyester resin obtained in Resin Preparation Example I-1 and 8.33 g of 1,1-bis(t-butylperoxy)3,3,5-trimethylcyclohexane were dissolved in 500 g of methyl ethyl ketone, and thereafter 20 g of ion-exchanged water containing 9.34 g of sodium hydroxide was added to neutralize the solution. Eight-hundred grams of ion-exchanged water was added to the neutralized solution with stirring, and thereafter methyl ethyl ketone was removed by distillation under reduced pressure of 40° C. to adjust water content, to give a thermosetting self-dispersible, water-based polyester resin (average particle size: 68 nm, solid ingredient: 33% by weight).

EXAMPLES I-2 to I-6 and COMPARATIVE EXAMPLE I-1

The same procedures as in Example I-1 were carried out except for using each of the compositions shown in Tables 1 and 2, to give each of the thermosetting water-based resin compositions. The solid ingredient, the number-average particle size, the storage stability and the thermosetting property of each of the resulting water-based resin compositions were evaluated in accordance with the following methods. The results are shown in Tables 1 and 2. Incidentally, in any of these cases, there were no irritable odors during the evaluation for the thermosetting property.

Evaluation Methods

[Solid Ingredient]

An aluminum cup was charged with 1 g of a water-based resin composition, and the aluminum cup was placed in an oven at 120° C. for 2 hours to allow drying. The solid ingredient of the water-based resin composition was calculated from a weight change before and after drying by the following equation.

$$\frac{\text{Weight (g) After Drying}}{\text{Weight (g) Before Drying}} \times 100 = \text{Solid Ingredient (\% by Weight)}$$

[Number-Average Particle Size]

Determined by a Coulter counter ("COULTER MODEL N4SD" manufactured by COULTER ELECTRONICS).

[Storage Stability of Water-Based Resin Composition]

The storage stability of the water-based resin composition was evaluated by the state of the particle size changes and the state of changes of the appearance of the resin obtained immediately after preparation, the resin obtained after storing the water-based resin composition for three months at ambient temperature (20° C.) and storing the composition for one month at 40° C. In addition, the particle size distribution was determined by a Coulter counter (product name "COULTER MODEL N4" manufactured by COULTER ELECTRONICS). In the table, the following evaluations are made in reference to the resin obtained immediately after preparation:

⊚: There are no changes in the particle size distribution and no changes in appearance.

○: There are some changes in the particle size distribution but no changes in appearance.

Δ: The particle size distribution drastically changes, and the precipitates are formed at bottom of liquid, but the original state is recovered when shaken.

x: The precipitates are formed at bottom of liquid, and the original state is not recovered even when shaken.

[Thermosetting Property of Water-Based Resin Composition]

The water-based resin composition was freeze-dried, to give a resin powder. The amount 1.0 g of this resin powder was taken and placed in a pellet molding machine, and a 10 kgf load (98 N) was applied thereto for 10 seconds, to prepare resin pellets having a diameter of 25 mm and a thickness of 2 mm. These resin pellets were placed in an oven at 200° C. for 120 seconds in a state in which 5 kgf load (49 N) was applied to evaluate the thermosetting property of the water-based resin composition. Here, "○" in the table means that the resin composition was heat-cured, and "x" means that the resin composition was not heat-cured.

TABLE 1

Ingredients of Water-Based Resin Composition

Oil-Soluble Initiator

| Ex. No. | Resin (300 g) | Compound | Temperature for One-Minute Half-Life (° C.) | Amount (g) | Additive Amount (g) |
|---|---|---|---|---|---|
| Ex. I-1 | I-a | 1-Bis(t-butyloxy)-3,3,5-methylcyclohexane | 149.0 | 8.33 | — |
| Ex. I-2 | I-b | 1,1-Bis(t-hexylperoxy)-3,3,5-trimethylcyclohexane | 147.1 | 13.64 | — |
| | | 2,5-Dimethyl-2,5-di(t-butylperoxy)hexane | 179.8 | 3.33 | |
| Ex. I-3 | I-b | Lauroyl Peroxide | 116.4 | 1.5 | *1 |
| | | Dicumyl Peroxide | 175.2 | 1.5 | 80 |
| Ex. I-4 | I-c | 1,1'-Azobis-1-cyclohexane-carbonitrile | 141.0 | 3.0 | — |
| | | Di-t-butyl Peroxide | 185.9 | 3.0 | |

Properties of Resin Dispersion System

| Ex. No. | Solid Ingredient (% by weight) | Number-Average Particle Size (nm) | Storage Stability Ambient Temp., 3 months. | Storage Stability 40° C., 1 mon. | Thermosetting Property |
|---|---|---|---|---|---|
| Ex. I-1 | 33 | 68 | ◉ | ◉ | ○ |
| Ex. I-2 | 45 | 330 | ◉ | ◉ | ○ |
| Ex. I-3 | 48 | 420 | ◉ | ◉ | ○ |
| Ex. I-4 | 42 | 120 | ◉ | ◉ | ○ |

Note *1: Sodium polyoxyethylene lauryl ether sulfate (25% by weight aqueous solution).

TABLE 2

Ingredients of Water-Based Resin Composition

Oil-Soluble Initiator

| Ex. No. | Resin (300 g) | Compound | Temperature for One-Minute Half-Life (° C.) | Amount (g) | Additive Amount (g) |
|---|---|---|---|---|---|
| Ex. I-5 | I-d | t-Butylperoxy-2-ethylhexanoate | 134.0 | 18.0 | *1 80 |
| Ex. I-6 | I-e | Bis(4-t-butylcyclohexyl)-peroxydicarbonate | 92.1 | 3.0 | *1 80 |
| | | t-Amylperoxy-3,5,5-trimethylhexanoate | 130.0 | 3.26 | |
| | | Di-t-butyl Peroxide | 185.9 | 3.0 | |
| Comp. Ex. I-1 | I-a | None | — | — | — |

Properties of Resin Dispersion System

| Ex. No. | Solid Ingredient (% by weight) | Number-Average Particle Size (nm) | Storage Stability Ambient Temp., 3 months. | Storage Stability 40° C., 1 mon. | Thermosetting Property |
|---|---|---|---|---|---|
| Ex. I-5 | 38 | 680 | ◉ | ◉ | ○ |
| Ex. I-6 | 37 | 550 | ◉ | ◉ | ○ |
| Comp. Ex. I-1 | 33 | 70 | ◉ | ◉ | X |

Note *1: Sodium polyoxyethylene lauryl ether sulfate (25% by weight aqueous solution).

It is clear from the results of Tables 1 and 2 that all of the water-based resin compositions obtained in Examples I-1 to I-6 are free from irritable odors and excellent in the storage stability, and further that these resin compositions are more excellent in the thermosetting property as compared to the water-based resin composition obtained in Comparative Example I-1.

EXAMPLE I-7

Lauan wooden pieces were subjected to cutting with a ring flaker (blade: 0.6 mm), and sieved using a sieve (sieve opening 6 mm), to be classified into sieve-on oriented cutting pieces and sieve-pass fine pieces. Next, 146 g of the water-based resin composition of Example I-2 (solid ingredient: 45% by weight) was mixed with 1 kg of the oriented cutting pieces (weight on absolute dry basis), with applying the water-based resin composition to the oriented cutting pieces with a sprayer. Thereafter, the applied coating was dried by passing through a flash dryer until the water content reached 8% by weight, to provide an inner layer material for molding. Similarly, the same process was carried out by using 1 kg of fine pieces and 208 g of the water-based resin composition of Example I-2, to provide a surface layer material for molding.

Next, 100 g of the surface layer material for molding, 200 g of the inner layer material for molding and 100 g of the surface layer material for molding were sequentially placed in a molding frame of 10 cm in length and 25 cm in width, and pressed, to give a mold precursor.

Subsequently, the mold precursor was inserted into a hot pressing machine of which upper and lower plates were heated to a temperature of 200° C., and subjected to hot-pressing under conditions of a temperature of 200° C., a pressure of 20 kgf/cm$^2$ (1.96 MPa) and a time period of 8 minutes, to prepare a wooden board (particle board (PB) type). This board sample was evaluated by a method in accordance with JIS A5908, and it was found that the flexural strength in the length direction was 35 N/mm$^2$, and that in the width direction was 28 N/mm$^2$, exhibiting sufficient strength.

EXAMPLE I-8

Lauan wooden powder prepared by crushing lauan wooden pieces was used as a mold substrate, and the wooden powder for molding was prepared in the same manner as in Example I-7 except for adding 208 g of the water-based resin composition of Example I-3 (solid ingredient: 48% by weight) to 1 kg of the lauan wooden powder (weight on absolute dry basis).

Next, 190 g of the wooden powder for molding was placed in the molding frame described above, and pressed, to give a mold precursor. Thereafter, the mold precursor was inserted into the hot pressing machine described above, and subjected to hot-pressing for 4 minutes (the temperature and the pressure are the same as Example I-7), to prepare a wooden board (medium fiber board (MDF) type) sample. This board sample was evaluated by a method in accordance with JIS A5905, and it was found that the flexural strength was 48 N/mm$^2$, exhibiting sufficient strength.

EXAMPLE I-9

Pieces of clothes and textiles disintegrated to pieces of threads were used as a mold substrate, and a cloth fiber board sample was prepared in the same manner as in Example I-8, and evaluated, except for adding 625 g of the water-based resin composition of Example I-6 (solid ingredient: 37% by weight) to 1 kg of the pieces of threads (weight on absolute dry basis). It was found that the flexural strength was 46 N/mm$^2$, exhibiting sufficient strength.

RESIN PREPARATION EXAMPLE II-1

The amount 1050 g of PO (2.2 moles) adduct of bisphenol A, 320 g of maleic anhydride (100 mol % of the acid component) and 0.35 g of hydroquinone were stirred at 210° C. under nitrogen stream. The reaction was terminated when the AV reached 23.7 mg KOH/g. The resulting polyester resin was a pale yellowish solid, and its OHV was 32.5 mg KOH/g, the Tg 52.4° C., the Tm 93.1° C., and the number-average molecular weight 2860. This resin is referred to as Resin II-a.

RESIN PREPARATION EXAMPLE II-2

The amount 1050 g of PO (2.2 moles) adduct of bisphenol A, 313 g of fumaric acid (81.8 mol % of the acid component), 20 g of 6-amino-n-caproic acid, 1.3 g of dibutyltin oxide and 0.4 g of hydroquinone were reacted in the same manner as in Resin Preparation Example II-1. Subsequently, 87 g of trimellitic anhydride was added to the reaction mixture, and the reaction was terminated when the AV reached 46.3 mg KOH/g. The resulting polyester-polyamide resin was a pale yellowish solid, and its OHV was 43.8 mg KOH/g, the amine value less than 0.1 mg KOH/g, the Tg 54.7° C., the Tm 97.8° C., and the number-average molecular weight 2530. This resin is referred to as Resin II-b.

RESIN PREPARATION EXAMPLE II-3

The amount 138 g of propylene glycol, 290 g of hydrogenated bisphenol A, 273 g of maleic anhydride (86.1 mol % of the acid component), 83 g of trimellitic anhydride, 0.4 g of hydroquinone and 1.0 g of dibutyltin oxide were reacted in the same manner as in Resin Preparation Example II-1. The reaction was terminated when the AV reached 28.4 mg KOH/g. The resulting polyester resin was a pale yellowish solid, and its OHV was 25.1 mg KOH/g, the Tg 42.7° C., the Tm 101.3° C., and the number-average molecular weight 3500. This resin is referred to as Resin II-c.

EXAMPLE II-1

Three-hundred grams of the resin II-a obtained in Resin Preparation Example II-1, 12 g of di-t-butyl peroxide, 70 g of diallyl isophthalate, 100 g of diallyl phthalate prepolymer were dissolved in 500 g of methyl ethyl ketone, and thereafter 20 g of ion-exchanged water containing 6.1 g of sodium hydroxide was added to neutralize the solution. Eight-hundred grams of ion-exchanged water and 80 g of sodium polyoxyethylene lauryl ether sulfate (25% by weight aqueous solution) were added to the neutralized solution with stirring, and thereafter methyl ethyl ketone was removed by distillation at 40° C. under reduced pressure to adjust the water content, to give a thermosetting self-dispersible, water-based polyester resin (average particle size: 380 nm, solid ingredient: 50% by weight).

EXAMPLES II-2 and II-3

The same procedures as in Example II-1 were carried out except for using each of the compositions shown in Table 3, to give each of the thermosetting water-based resin compositions.

The storage stability and the thermosetting property of each of the water-based resin compositions obtained in Examples II-1 to II-3 were evaluated by the method described above and in accordance with the following methods, respectively. The results are shown in Table 3. In the evaluation of odor, in any of these cases before and after molding, no formaldehyde was detected and no irritable odors were found.

Evaluation Method

[Preparation Conditions of Molding Product]

A stainless molding frame (3 cm×12 cm) was charged with 15 g, on a solid basis, of a molding compound composition prepared by taking 100 g, on a solid basis, of the above water-based resin composition, relative to 100 g of the substrate for which cotton was used as a substrate, and the water-based resin composition was spray-coated to and mixed with the substrate. The molding compound composition was molded with a heat-press molding machine under the conditions of a load of 18 kgf/cm$^2$ (1.76 MPa), a temperature of 190° C. and a time period of 90 seconds, to give a molding product having a thickness of 5 mm. The following evaluations for the thermosetting property were made using this molding product, and the results are summarized in Table 3.

[Properties of Molding Product]

The evaluations for the flexural strength and the external appearance of the prepared molding product were carried out as the properties of the molding product.

The flexural strength was measured in accordance with JIS K 6911, and each of the flexural strengths for 5 tests [expressed by 1) to 5) in the table] and its average value are summarized in Table 3. In the table, the external appearance was evaluated as follows:

○: No uneven lumps of resins on the molding product surface.

Δ: Several uneven lumps of resins on the molding product surface.

x: Some uneven lumps of resins on the molding product surface, and some portions of the substrate not covered with the resin.

[Heat Resistance of Molding Product]

The hardness of the molding product immediately after placing the prepared molding product in an oven at 110° C. for 1 hour was evaluated as follows in the table.

○: Having a state in which the molding product was just as hard as that before placing in the oven.

Δ: Having a state in which the molding product was somewhat softened as compared to that before placing in the oven.

x: Having a state in which the molding product was completely softened as compared to that before placing in the oven.

[Water Resistance of Molding Product]

The external appearance in the state change of the molding product was evaluated after immersing the prepared molding product in water at 50° C. for 6 hours as follows.

○: No changes in the molding product.

Δ: The molding product being partially swollen, or the molding product surface being partially spongy.

x: The molding product being entirely swollen, and spongy.

[Evaluation of Odor]

During Molding

The presence or absence of the generation of formaldehyde gas near the molding product during molding was determined by using a gas detection tube.

After Molding

The resulting molding product was placed in a desiccator, and allowed to stand for 24 hours. The presence or absence of the generation of formaldehyde gas in the desiccator was determined by using a gas detection tube.

COMPARATIVE EXAMPLE II-1

A flask was charged with 300 g of the resin II-a, 70 g of diallyl isophthalate and 100 g of diallyl phthalate prepolymer, and the ingredients were heated to 160° C. to be dissolved and mixed. Thereafter, the mixture was cooled and solidified, and pulverized to an average particle size of 150 μm. Six grams of di-t-butyl peroxide was spray-coated on one-half the amount, 235 g, of the pulverized product, and the coated product was stirred with a blender, to give a thermosetting resin powder.

[Preparation Conditions for Molding Product]

One-hundred grams of the above thermosetting resin powder was taken in relative to 100 g of the substrate for which cotton was used as a substrate, and the substrate and the resin powder were stirred and mixed with a blender, to give a molding material composition. A molding product was prepared in the same manner as in Example II-1 except for using 15 g of this composition. The thermosetting property of the molding product was evaluated, and the results are summarized in Table 3. Incidentally, as to the evaluation for odors, formaldehyde was not detected before or after molding, and no irritable odors were found.

TABLE 3

| | | | Ingredients of Water-Based Resin Composition or Ingredients for Preparing Resin Powder (g) | | | | |
|---|---|---|---|---|---|---|---|
| Ex. No. | Resin (300 g) | Oil-Soluble Initiator | Unsaturated Bonds-Containing Compound | Organic Solvent | Neutralizing Agent | Additive | Water |
| Ex. II-1 | II-a | Di-t-butyl peroxide (12) | Diallyl Isophthalate (70) Diallyl Phthalate Prepolymer (100) | Methyl Ethyl Ketone (500) | Sodium Hydroxide (6.1) | *1 (80) | 820 |
| Ex. II-2 | II-b | Bis(4-t-butylcyclohexyl)-peroxydicarbonate (10) 1,1-Di(t-amylperoxy)-3,5,5-trimethylcyclohexane (16.7) Di-t-butyl peroxide (6) | Diallyl Terephthalate (65) | Methyl Ethyl Ketone (500) | Sodium hydroxide (13.9) | — | 820 |
| Ex. II-3 | II-c | t-Butylperoxy-2-ethylhexylcarbonate (9) Di-t-butyl peroxide (9) | Diallyl Isophthalate (80) | Tetrahydrofuran (500) | Sodium Hydroxide (8.5) | Sodium Dioctylsulfosuccinate (10) Sodium Persulfate (3) | 820 |
| Comp. Ex. II-1 | II-a | Di-t-butyl peroxide (12) | Diallyl Isophthalate (70) Diallyl Phthalate Prepolymer (100) | — | — | — | — |

| | Properties of Resin Dispersion System | | | |
|---|---|---|---|---|
| | Solid | Number-Average Particle | Storage Stability | |
| Ex. No. | Ingredient (% by weight) | Size (nm) | 20° C., 3 months. | 40° C., 1 mon. |
| Ex. II-1 | 50 | 380 | ◎ | ◎ |
| Ex. II-2 | 45 | 280 | ◎ | ◎ |
| Ex. II-3 | 42 | 530 | ◎ | ○ |
| Comp. Ex. II-1 | 100 | 150 | — | — |

| | Thermosetting Properties | | | |
|---|---|---|---|---|
| | Properties of Molding Product | | Heat | Water Resistance |
| Ex. No. | Flexural Strength (N/mm²) | External Appearance | Resistance (110° C., 1 hr) | (50° C., 6 hrs) |
| Ex. II-1 | 1) 45  Average 2) 43  Value: 3) 44  45.0 4) 47 5) 46 | ○ ○ ○ ○ ○ | ○ ○ ○ ○ ○ | ○ ○ ○ ○ ○ |

TABLE 3-continued

| | | | | | | |
|---|---|---|---|---|---|---|
| Ex. II-2 | 1) 41 | Average | ○ | ○ | ○ | |
| | 2) 43 | Value: | ○ | ○ | ○ | |
| | 3) 43 | 42.6 | ○ | ○ | ○ | |
| | 4) 42 | | ○ | ○ | ○ | |
| | 5) 44 | | ○ | ○ | ○ | |
| Ex. II-3 | 1) 44 | Average | ○ | ○ | ○ | |
| | 2) 44 | Value: | ○ | ○ | ○ | |
| | 3) 44 | 44.0 | ○ | ○ | ○ | |
| | 4) 43 | | ○ | ○ | ○ | |
| | 5) 45 | | ○ | ○ | ○ | |
| Comp.Ex. II-1 | 1) 42 | Average | Δ | ○ | ○ | |
| | 2) 25 | Value: | X | Δ | Δ | |
| | 3) 31 | 34.4 | Δ | Δ | Δ | |
| | 4) 40 | | Δ | ○ | ○ | |
| | 5) 34 | | Δ | ○ | ○ | |

Note *1: Sodium polyoxyethylene lauryl ether sulfate (25% by weight aqueous solution).

It is clear from the results of Table 3 that all of the water-based resin compositions obtained in Examples II-1 to II-3 are free from irritable odors and excellent in the storage stability, and that the molding product is excellent in the homogeneous strength in the heat-curing, the heat resistance and the water resistance, as compared to those properties in Comparative Example II-1.

EXAMPLE II-4

Lauan wooden powder prepared by crushing lauan wooden pieces was used as a mold substrate, and 300 g of the water-based resin composition of Example II-1 (solid ingredient: 50% by weight) and 1 kg of the lauan wooden powder were mixed by spray-coating the resin composition, to give a wooden powder for molding.

Next, 120 g of the wooden powder for molding was placed in the molding frame of 10 cm in length and 25 cm in width, and pressed, to give a mold precursor. Thereafter, the mold precursor was inserted into the hot pressing machine heated to 190° C., and under conditions of a load of 25 kgf/cm$^2$ (2.45 MPa), a temperature of 190° C., and a time period of 120 seconds, to prepare a wooden board (medium fiber board (MDF) type) sample of 6 mm in thickness. This board sample was evaluated by a method in accordance with JIS A5905, and it was found that the flexural strength was 45 N/mm$^2$, exhibiting sufficient strength.

EXAMPLE II-5

Pieces of clothes and textiles disintegrated to pieces of threads were used as a mold substrate, and a cloth fiber board sample was prepared in the same manner as in Example II-4, and evaluated, except for adding 714 g of the water-based resin composition of Example II-3 (solid ingredient: 42% by weight) to 1 kg of the pieces of threads. It was found that the flexural strength was 43 N/mm$^2$, exhibiting sufficient strength.

RESIN PREPARATION EXAMPLE III-1

The amount 1050 g of PO (2.2 moles) adduct of bisphenol A, 294 g of maleic anhydride (97.1 mol % of the acid component), 17.3 g of trimellitic anhydride, 0.41 g of hydroquinone and 0.60 g of dibutyltin oxide were stirred at 210° C. under nitrogen stream. The reaction was terminated when the AV reached 25.0 mg KOH/g. The resulting polyester resin was a pale yellowish solid, and its OHV was 32.6 mg KOH/g, the Tg 54.1° C., the Tm 95.3° C., and the number-average molecular weight 3000. This resin is referred to as Resin III-a.

EXAMPLE III-1

Three-hundred grams of the polyester resin obtained in Resin Preparation Example III-1 and 18 g of di-t-butyl peroxide were dissolved in 500 g of methyl ethyl ketone, and thereafter 20 g of ion-exchanged water containing 7.22 g of sodium hydroxide was added to neutralize the solution. Eight-hundred grams of an aqueous solution of the acetylene glycol compound [formula (c), wherein a sum of m and n is 10], prepared by adding 20 g of the acetylene glycol compound to ion-exchanged water, was added with stirring. Thereafter, methyl ethyl ketone was removed by distillation under reduced pressure of 40° C. to adjust water content, to give a thermosetting, water-based polyester resin (average particle size: 220 nm, solid ingredient: 52% by weight, liquid viscosity: 186 mPa·s).

The properties and the thermosetting property of each of the water-based resin compositions were evaluated in accordance with the following methods. Incidentally, the solid ingredient, the number-average particle size, the storage stability and the odor were evaluated by the methods described above.

Evaluation Methods

Liquid Viscosity

The viscosity at 20° C. was determined by a rotational oscillating viscometer "DIGITAL VISCOMATE VM-100" (manufactured by Yamaichi Electronics Co., Ltd.).

Free Flowability

The free flowability at 20° C. was determined by a method in accordance with JIS K 5400, Ford cup No. 4. The handleability was evaluated as follows from the observed values.

⊚: The observed value was from 0 to 90 sec, having very excellent handleability.

○: The observed value was from 91 to 180 sec, having excellent handleability.

Δ: The observed value was from 181 to 300 sec, having usual handleability.

x: The observed value was exceeding 300 sec, having poor handleability.

Thermosetting Property of Molding Product

A stainless molding frame (3 cm×12 cm) was charged with 15 g, on a solid basis, of a molding compound composition prepared by taking 100 g, on a solid basis, of the above water-based resin composition, relative to 100 g of the substrate for which cotton was used as a substrate, and the water-based resin composition was spray-coated to and mixed with the substrate. The molding compound composition was molded with a heat-press molding machine under the conditions of a load of 25 kgf/cm$^2$ (2.45 MPa), and the following molding temperature and time period conditions. The evaluations for the thermosetting property were made using this molding product, and the results are summarized in Table 4.

Conditions A: 160° C., 90 sec.
Conditions B: 200° C., 90 sec.
In addition, the table indicates the evaluation as follows.
○: The molding compound composition was heat-cured.
Δ: The molding compound composition was insufficiently heat-cured.
x: The molding compound composition was not heat-cured.

EXAMPLE III-2 and EXAMPLES A and B

The same procedures as in Example III-1 were carried out except for using each of the compositions shown in Table 4, to give each of thermosetting water-based resin compositions. The storage stability and the thermosetting property of each of the resulting water-based resin compositions were evaluated in accordance with the methods described above. The results are shown in Table 4.

TABLE 4

| | | | Ingredients of Water-Based Resin Composition (g) | | | | | | |
|---|---|---|---|---|---|---|---|---|---|
| Ex. No. | Resin (300 g) | Oil-Soluble Initiator | Unsaturated Bonds-Containing Compound | Organic Solvent | Neutralizing Agent | Acetylene Glycol Compound | Additive | Water |
| Ex. III-1 | III-a | Di-t-butyl peroxide (18) | — | MEK*2 (500) | NaOH (7.22) | Cpd. (c) (m + n = 10) (20) | — | 820 |
| Ex. III-2 | III-a | Bis(4-t-butylcyclohexyl)-peroxydicarbonate (6) t-Butylperoxy-2-ethylhexylcarbonate (15.6) Di-t-butyl peroxide (9) | Diallyl phthalate (65) | MEK (500) | NaOH (6.95) | Cpd. (c) (m + n = 30) (30) | *1 (50) | 820 |
| Ex.-A | III-a | Di-t-butyl peroxide (18) | — | MEK (500) | NaOH (6.95) | — | — | 820 |
| Ex.-B | III-a | Di-t-butyl peroxide (18) | — | MEK (500) | NaOH (6.95) | — | *1 (50) | 820 |

| | Properties of Resin Dispersion System | | | | | | Thermosetting Properties | |
|---|---|---|---|---|---|---|---|---|
| | Solid Ingredient | Number-Average Particle Size | Liquid Viscosity | | Storage Stability | | Condition A | Condition B |
| Ex. No. | (% by weight) | (nm) | (mPa·s) | Fluidity (sec) | 20° C., 3 mons | 40° C, 1 mon. | 160° C., 90 sec | 200° C., 90 sec |
| Ex. III-1 | 52 | 220 | 186 | 48 ◉ | ◉ | ◉ | ○ | ○ |
| Ex. III-2 | 58 | 340 | 253 | 56 ◉ | ◉ | ◉ | ○ | ○ |
| Ex.-A | 44 | 465 | 570 | >300 X | ◉ | ○ | Δ | ○ |
| Ex.-B | 50 | 467 | 381 | 193 Δ | ◉ | ◉ | Δ | ○ |

Note *1: Sodium polyoxyethylene lauryl ether sulfate (25% by weight aqueous solution).
*2: MEK stands for methyl ethyl ketone.

It is clear from the results of Table 4 that both of the water-based resin compositions obtained in Examples III-1 and III-2 are free from irritable odors and excellent in the storage stability and the thermosetting property, and further have low liquid viscosities and excellent handleability, enabling shortening the molding time, as compared to those obtained in Examples A and B. Incidentally, when the thermosetting property of the water-based resin compositions obtained in Examples III-1 and III-2 were evaluated, formaldehyde was not detected and no irritable odor was found in both cases.

EXAMPLE III-3

Lauan wooden powder prepared by crushing lauan wooden pieces was used as a mold substrate, and 300 g of the water-based resin composition of Example III-2 (solid ingredient: 58% by weight) and 1 kg of the lauan wooden powder were mixed by spray-coating the resin composition, to give a wooden powder for molding.

Next, a wooden board (medium fiber board (MDF) type) sample of 6 mm in thickness obtained by molding in the same manner as in Example II-4 was evaluated by a method in accordance with JIS A5905. It was found that the flexural strength was 48 N/mm$^2$, exhibiting sufficient strength.

EXAMPLE III-4

The same procedures as in Example III-3 were carried out except for adding 5 g of potassium persulfate as a water-soluble initiator to 300 g of the water-based resin composition of Example III-2 (solid ingredient: 58% by weight), to prepare a board sample. This board sample was evaluated in the same manner as in Example III-3, and it was found that the flexural strength was 50 N/mm$^2$, exhibiting sufficient strength.

EXAMPLE III-5

Pieces of clothes and textiles disintegrated to pieces of threads were used as a mold substrate, and a cloth fiber board sample was prepared in the same manner as in Example III-3, and evaluated, except for adding 517 g of the water-based resin composition of Example III-2 (solid ingredient: 58% by weight) to 1 kg of the pieces of threads. It was found that the flexural strength was 44 N/mm$^2$, exhibiting sufficient strength.

RESIN PREPARATION EXAMPLE IV-1

The amount 1050 g of PO (2.2 moles) adduct of bisphenol A, 313 g of fumaric acid (81.8 mol % of the acid component), 90 g of dimer acid, 60 g of trimellitic anhydride, 0.7 g of hydroquinone and 2.1 g of dibutyltin oxide were reacted with stirring at 210° C. under nitrogen stream. The reaction was terminated when the AV reached 36.4 mg KOH/g. The resulting polyester resin was a pale yellowish solid, and its OHV was 24.4 mg KOH/g, the SV 266 mg KOH/g, the Tg 54.1° C., the Tm 97.8° C., and the number-average molecular weight 3500. This resin is referred to as Resin IV-a.

RESIN PREPARATION EXAMPLE IV-2

One-hundred and fifty grams of ethylene glycol, 31 g of neopentyl glycol, 72 g of hydrogenated bisphenol A, 305 g of fumaric acid (79.6 mol % of the acid component), 85 g of trimellitic anhydride, 0.3 g of hydroquinone and 1.0 g of dibutyltin oxide were reacted in the same manner as in Resin Preparation Example IV-1. The reaction was terminated when the AV reached 58.4 mg KOH/g. The resulting polyester resin was a pale yellowish solid, and its OHV was 25.4 mg KOH/g, the SV 695 mg KOH/g, the Tg 41.1° C., the Tm 83.9° C., and the number-average molecular weight 2980. This resin is referred to as Resin IV-b.

RESIN PREPARATION EXAMPLE IV-3

The amount 1050 g of PO (2.2 moles) adduct of bisphenol A, 265 g of maleic anhydride (83.7 mol % of the acid component), 20 g of 6-amino-n-caproic acid, 0.6 g of hydroquinone and 2.0 g of dibutyltin oxide were reacted in the same manner as in Resin Preparation Example IV-1. Subsequently, 57 g of trimellitic anhydride was added to the reaction mixture, and the reaction was terminated when the AV reached 49.1 mg KOH/g. The resulting polyester-polyamide resin was a pale yellowish solid, and its OHV was 46.7 mg KOH/g, the SV 288 mg KOH/g, the amine value less than 0.1 mg KOH/g, the Tg 55.7° C., the Tm 96.8° C., and the number-average molecular weight 2960. This resin is referred to as Resin IV-c.

RESIN PREPARATION EXAMPLE IV-4

One-hundred and sixty-seven grams of ethylene glycol, 72 g of hydrogenated bisphenol A, 265 g of maleic anhydride (85.7 mol % of the acid component), 58 g of trimellitic anhydride, 0.3 g of hydroquinone and 0.8 g of dibutyltin oxide were reacted in the same manner as in Resin Preparation Example IV-1. The reaction was terminated when the AV reached 33.3 mg KOH/g. The resulting polyester resin was a pale yellowish solid, and its OHV was 25.6 mg KOH/g, the SV 779 mg KOH/g, the Tg 29.4° C., the Tm 81.6° C., and the number-average molecular weight 2660. This resin is referred to as Resin IV-d.

EXAMPLE IV-1

Three-hundred grams of the resin IV-a obtained in Resin Preparation Example IV-1, 9 g of bis(4-t-butylcyclohexyl) peroxydicarbonate and 10 g of t-butylperoxy-2-ethylhexylcarbonate were dissolved in 500 g of methyl ethyl ketone, and thereafter 20 g of ion-exchanged water containing 9.7 g of sodium hydroxide was added to neutralize the solution. Eight-hundred grams of ion-exchanged water and 80 g of a 25% by weight aqueous solution of sodium polyoxyethylene lauryl ether sulfate (average additional molar number of ethylene oxide: 20 moles) were added to the solution with stirring. Thereafter, methyl ethyl ketone was removed by distillation at 40° C. under reduced pressure to adjust the water content, to give a thermosetting, water-based polyester resin (average particle size: 300 nm, solid ingredient: 44% by weight).

EXAMPLES IV-2 to IV-5

The same procedures as in Example IV-1 were carried out except for using each of the compositions shown in Tables 5 and 6, to give each of the thermosetting water-based resin compositions. The storage stability, the thermosetting property and the water resistance of each of the resulting water-based resin compositions were evaluated in accordance with the following methods. The results are shown in Tables 5 and 6. Incidentally, the storage stability of the water-based resin composition, the preparation conditions of the molding product, the flexural strength, the water resistance and the odor were evaluated as described above. In any of these cases, there were no irritable odor during the evaluation for the thermosetting property. In the tables, the units for AV and SV are expressed in mg KOH/g. In addition, the acetylene glycol compound used in Example IV-3 is "Acetylenol EH" (manufactured by Kawaken Fine Chemicals Co., Ltd.).

TABLE 5

| | | | | Ingredients of Water-Based Resin Composition (g) | | | | | |
|---|---|---|---|---|---|---|---|---|---|
| Ex. No. | Resin (300 g) | Oil-Soluble Initiator | Wax | Unsaturated Bonds-Containing Compound | Organic Solvent | Neutra-lizing Agent | Additive | Water |
| Ex. IV-1 | IV-a (AV = 36.4 SV = 266) | Bis(4-t-butylcyclohexyl)-peroxydicarbonate (9) t-Butylperoxy-2-ethylhexyl carbonate (10) | — | — | Methyl Ethyl Ketone (500) | Sodium Hydrox-ide (9.7) | *1 (80) | 820 |

TABLE 5-continued

| Ex. IV-2 | IV-a (AV = 36.4 SV = 266) | Bis(4-t-butylcyclohexyl)-peroxydicarbonate (9) t-Butylperoxy-2-ethylhexyl carbonate (10) | — | Diallyl isophthalate (70) | Methyl Ethyl Ketone (500) | Sodium Hydroxide (9.7) | *2 (30) *1 (80) | 820 |
| --- | --- | --- | --- | --- | --- | --- | --- | --- |
| Ex. IV-3 | IV-a (AV = 36.4 SV = 266) | Bis(4-t-butylcyclohexyl)-peroxydicarbonate (9) t-Butylperoxy-2-ethylhexyl carbonate (10) | Paraffin Wax (1.8) | Diallyl isophthalate (70) | Methyl Ethyl Ketone (500) | Sodium Hydroxide (9.7) | *2 (30) *1 (80) | 820 |

| | Properties of Resin Dispersion System | | | Thermosetting Properties | |
| --- | --- | --- | --- | --- | --- |
| | Solid | Number-Average Particle | Storage Stability | of Molding Product Flexural | Water Resistance |
| Ex. No. | Ingredient (% by weight) | Size (nm) | 20° C., 3 months. / 40° C., 1 mon. | Strength (N/mm$^2$) | (50° C., 6 hr.) |
| Ex. IV-1 | 44 | 300 | ◎ / ◎ | 42 | ○ |
| Ex. IV-2 | 52 | 340 | ◎ / ◎ | 45 | ○ |
| Ex. IV-2 | 54 | 370 | ◎ / ◎ | 46 | ○ |

Note *1: Sodium polyoxyethylene lauryl ether sulfate (25% by weight aqueous solution).
*2: Acetylene glycol compound (Acetylenol EH).

TABLE 6

Ingredients of Water-Based Resin Composition (g)

| Ex. No. | Resin (300 g) | Oil-Soluble Initiator | Wax | Unsaturated Bonds-Containing Compound | Organic Solvent | Neutralizing Agent | Additive | Water |
| --- | --- | --- | --- | --- | --- | --- | --- | --- |
| Ex. IV-4 | IV-b (AV = 58.4 SV = 695) | Bis(4-t-butylcyclohexyl)-peroxydicarbonate (9) t-Butylperoxy-2-ethylhexyl carbonate (10) | Paraffin Wax (1.8) | Diallyl isophthalate (70) | Methyl Ethyl Ketone (500) | Sodium Hydroxide (13.7) | *1 (80) | 820 |
| Ex. IV-5 | IV-c (AV = 49.1 SV = 288) | t-Butylperoxy-2-ethylhexyl carbonate (12) | — | Diallyl phthalate (60) | Methyl Ethyl Ketone (500) | Sodium Hydroxide (12.6) | *1 (80) | 820 |

| | Properties of Resin Dispersion System | | | Thermosetting Properties | |
| --- | --- | --- | --- | --- | --- |
| | Solid | Number-Average Particle | Storage Stability | of Molding Product Flexural | Water Resistance |
| Ex. No. | Ingredient (% by weight) | Size (nm) | 20° C., 3 months. / 40° C., 1 mon. | Strength (N/mm$^2$) | (50° C., 6 hr.) |
| Ex. IV-4 | 44 | 420 | ◎ / ◎ | 41 | ○ |
| Ex. IV-5 | 46 | 310 | ◎ / ◎ | 43 | ○ |

Note *1: Sodium polyoxyethylene lauryl ether sulfate (25% by weight aqueous solution).

It is clear from Tables 5 and 6 that all of the water-based resin compositions obtained in Examples IV-1 to IV-5 are excellent in the storage stability, the thermosetting property and the water resistance. In addition, in the water-based resin compositions obtained in Examples IV-1 to IV-5, no formaldehyde was detected in either during or after molding, and no irritable odors were found.

EXAMPLE IV-6

Lauan wooden powder prepared by crushing lauan wooden pieces was used as a mold substrate, and 300 g of the water-based resin composition of Example IV-3 (solid ingredient: 54% by weight) and 1 kg of the lauan wooden powder were mixed by spray-coating the resin composition, to give a wooden powder for molding.

Next, a wooden board (medium fiber board (MDF) type) sample of 6 mm in thickness obtained by molding in the same manner as in Example II-4 was evaluated by a method in accordance with JIS A5905. It was found that the flexural strength was 44 N/mm², exhibiting sufficient strength.

EXAMPLE IV-7

The same procedures as in example IV-6 were carried out except for adding 4 g of potassium persulfate as a water-soluble initiator to 300 g of the water-based resin composition of Example IV-3 (solid ingredient: 54% by weight), to prepare a board sample. This board sample was evaluated in the same manner as in Example IV-6, and it was found that the flexural strength was 47 N/mm², exhibiting sufficient strength.

According to the present invention, there can be exhibited excellent effects that the environmental problems are improved by the use of the water-based resin composition of the present invention, and that since homogeneous curing reaction takes place, the molding compound composition excellent in the water resistance and the water-based resin composition suitable for obtaining the molding compound composition can be obtained.

What is claimed is:

1. A thermosetting water-based resin composition comprising an oil-soluble initiator of which a temperature for one-minute half-life is from 90° C. to 270° C. and a polycondensation resin comprising an unsaturated dicarboxylic acid having a radical-polymerizable unsaturated bond or an acid anhydride thereof as at least one constituent monomer, wherein the polycondensation resin has an acid value of from 3 to 100 mg KOH/g, and wherein said oil-soluble initiator is present in a particle of said polycondensation resin.

2. The thermosetting water-based resin composition according to claim 1, wherein the oil-soluble initiator is one or more compounds selected from the group consisting of organic peroxides and azo polymerization initiators.

3. The thermosetting water-based resin composition according to claim 1 or 2, wherein the polycondensation resin is a polyester or a polyester-polyamide.

4. The thermosetting water-based resin composition according to claim 1 or 2, further comprising a compound having two or more radical-polymerizable unsaturated bonds.

5. The thermosetting water-based resin composition according to claim 4, wherein the compound having two or more radical-polymerizable unsaturated bonds is one or more compounds selected from the group consisting of compounds having (meth)acryl groups at both ends, compounds having allyl group, and compounds having divinyl group.

6. The thermosetting water-based resin composition according to claim 1 or 2, further comprising an acetylene glycol compound represented by the formula (I):

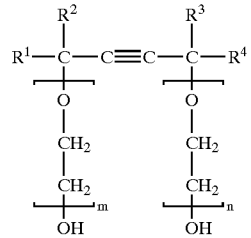

wherein each of $R^1$ to $R^4$ is independently a linear alkyl group having 1 to 6 carbon atoms and a branched alkyl group having 3 to 6 carbon atoms; and each of m and n is an integer of 0 or more.

7. The thermosetting water-based resin composition according to claim 1 or 2, further comprising a wax.

8. The thermosetting water-based resin composition according to claim 1 or 2, wherein the polycondensation resin has a saponification value of from 150 to 750 mg KOH/g.

9. A process for preparing a thermosetting water-based resin composition, the process comprising removing an organic solvent by distillation from a raw material composition comprising a polycondensation resin comprising an unsaturated dicarboxylic acid having a radical-polymerizable unsaturated bond or an acid anhydride thereof as at least one constituent monomer, wherein the polycondensation resin has an acid value of from 3 to 100 mg KOH/g; an oil-soluble initiator of which a temperature for one-minute half-life is from 900 to 270° C.; the organic solvent; a neutralizing agent; and water, to give the thermosetting water-based resin composition comprising the polycondensation resin and the oil-soluble initiator, wherein said oil-soluble initiator is present in a particle of said polycondensation resin.

10. The process according to claim 9, wherein the raw material composition further comprises a compound having two or more radical-polymerizable unsaturated bonds.

11. The process according to claim 9 or 10, wherein the raw material composition further comprises an acetylene glycol compound represented by the formula (I):

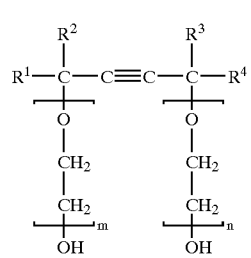

wherein each of $R^1$ to $R^4$ is independently a linear alkyl group having 1 to 6 carbon atoms and a branched alkyl group having 3 to 6 carbon atoms; and each of m and n is an integer of 0 or more.

12. The process according to claim 9 or 10, wherein the polycondensation resin has a saponification value of from 150 to 750 mg KOH/g.

13. A molding compound composition comprising the water-based resin composition of claim 1 or 2.

14. A molding product prepared by molding the molding compound composition of claim 13.

* * * * *